United States Patent [19]

Johnson

[11] 4,398,013

[45] Aug. 9, 1983

[54] ACCELERATOR FOR ANHYDRIDE-CURED EPOXY RESINS

[75] Inventor: Donald S. Johnson, Scotia, N.Y.

[73] Assignee: General Electric Company, Schenectady, N.Y.

[21] Appl. No.: 311,269

[22] Filed: Oct. 14, 1981

[51] Int. Cl.³ .............................................. C08G 59/68
[52] U.S. Cl. .................................. 528/89; 523/455; 525/337; 525/340; 528/91; 528/92; 528/361; 528/365; 204/159.11
[58] Field of Search ................... 528/89, 91, 92, 361, 528/365; 525/333, 337, 340, 359; 523/455; 204/159.11

[56] References Cited

U.S. PATENT DOCUMENTS

| | | | |
|---|---|---|---|
| 3,547,885 | 12/1970 | Dante et al. | 260/47 |
| 3,981,897 | 9/1976 | Crivello | 260/440 |
| 4,173,551 | 11/1979 | Crivello | 528/92 X |
| 4,283,312 | 8/1981 | Crivello | 528/92 X |
| 4,319,974 | 3/1982 | Crivello | 528/92 X |

*Primary Examiner*—Earl A. Nielsen
*Attorney, Agent, or Firm*—Hedman, Casella, Gibson, Costigan & Hoare

[57] ABSTRACT

An improved process for curing a polyepoxide composition with a polycarboxylic acid or polycarboxylic acid anhydride is described wherein the addition of a diphenyliodonium salt accelerator provides for shortened curing reaction times at lower reaction temperatures or at room temperatures if the composition is exposed to a source of ultraviolet radiation.

11 Claims, No Drawings

ACCELERATION FOR ANHYDRIDE-CURED EPOXY RESINS

BACKGROUND OF THE INVENTION

The present invention relates a process for curing epoxy resin compositions. More particularly, it relates to the curing of polyepoxides with carboxylic acids or acid anhydrides using a diphenyliodonium salt accelerator to reduce curing time of the reaction.

The curing of epoxy resin composition with carboxylic acids or acid anhydrides is known. Generally a Brønsted acid may be used to produce homopolymerization and copolymerization of polyepoxides simultaneously. Useful Brønsted acid type curing agents are polyfunctional phenols, polyfunctional organic acids and anhydrides of mono and difunctional organic acids. These acid type curing agents react with polyepoxides in two different reactions as follows:

(a) first by an esterification reaction,

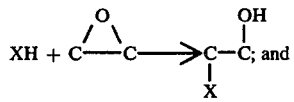

(b) by an etherification reaction,

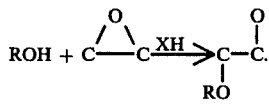

The esterification reaction may be catalyzed by either acid or base. When acid is used, the etherification reaction proceeds more rapidly. In a base the etherification reaction is suppressed as follows:

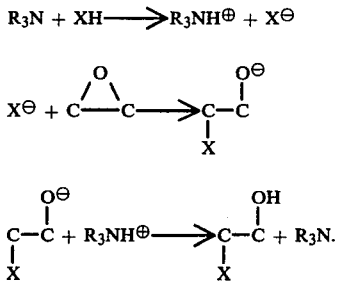

If a cyclic anhydride curing agent is used, the anhydride must first be converted to the monoester/monoacid in order to react as follows:

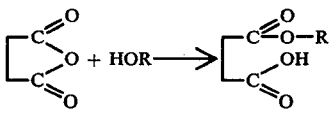

The new acid reacts to produce a new hydroxyl group which reacts with a new anhydride group and so on.

The carboxylic acids and acid anhydride curing agents have a serious shortcoming in that they are inactive to cure polyepoxides at room temperatures. It is only at very high temperatures that acids or acid anhydrides become effective curing agents. This prevents their use in preparation of compositions that are to be cured at a lower temperature or compositions that might be injured by the high temperatures. Even at high reaction temperatures, the acids or acid anhydrides usually react very slowly so that they are generally undesirable for use when the cure must take place rapidly.

Accordingly, it has been proposed to add certain materials to accelerate the cure of epoxides with acids or acid anhydrides. One frequently employed additive is a strong Lewis acid. The Lewis acids suitable for catalyzing the polymerization of epoxy resins are those with unfilled orbitals in their outer shells, i.e. Friedel-Crafts type, such as stannic chloride or boron trifluoride. These Lewis acids are generally either gases or solids. Boron trifluoride, or gas, is useful for synthesizing aliphatic epoxies from epichlorohydrin but not so useful as a curing agent per se. The solid Lewis acids, like stannic chloride, are useful only in solution. These strong Lewis acids are extremely reactive, even with the glycidyl ether resins, in that the reaction progresses beyond the gel stage in from 30 to 90 seconds. The concentration of the catalyst is critical, above the critical concentration the reaction goes extremely rapidly, below, only gel structure results. Strong Lewis acids are inherently too fast for all but a limited number of commerical applications.

Another proposed additive is a phosphonium halide catalyst which is described by Dante et al. in U.S. Pat. No. 3,547,885. The phosphonium halides are effective at reducing the temperatures at which acids or acid anhydrides become active curing agents for polyepoxides from above 200° C., generally to temperature of from 50° C. to 200° C., and usually between 100° to 200° C. These compositions still require heating to effect the curing of polyepoxides. When the compositions are used as coatings for electrical equipment, the heating required to activate the acid or anhydride curing reaction may also lead to material run off and loss prior to cure.

It has now been discovered that the diphenyliodonium salts may serve as outstanding accelerators in a curing reaction of polyepoxides with acids or acid anhydrides. Exhibiting sensativity to both ultra violet light and to heat, the salts are easily decomposed to produce Lewis acid catalysts for promoting the curing reaction. The curing reactions occur at much faster rates and at lower temperatures. An added advantage of these diphenyliodonium salts is that they may serve as photoinitiators for the curing reaction without the need for heating. They are especially useful in vacuum pressure impregnation systems and as coatings because they provide a choice of thermal or ultraviolet cure or a combination of both. For example, a coated article or vacuum pressure impregnated piece of equipment may first be irradiated with ultraviolet light to cocoon the article or mold at room temperature, followed by heating to fully, thermally cure the interior so that material run off or loss during the process may be minimized.

SUMMARY OF THE INVENTION

Accordingly, the present invention relates to an improved process for curing polyepoxides which includes preparing an admixture comprising a polyepoxide, a carboxylic acid or an acid anhydride and adding a diphenyliodonium salt accelerator. A curing reaction is initiated either by exposing the admixture to ultraviolet radiation or by heating the admixture to between 100°

C. and 200° C., and then allowing the curing reaction to continue until substantially complete. The addition of the diphenyliodonium salt effectively reduces the curing time for the polyepoxide compositions and provides a method for curing them at lower temperatures.

A preferred admixture of the subject invention comprises diglycidyl ether of bisphenol A, tetrahydrophthalic anhydride, and diphenyliodonium hexafluoroarsenate.

Other objects and advantages of the subject invention will become apparent from the following detailed description.

DETAILED DESCRIPTION OF THE INVENTION

The subject invention provides a new and improved process for curing polyepoxide resins with carboxylic acids or acid anhydrides by the addition of a diphenyliodonium salt accelerator to the reaction mixture.

The diphenyliodonium salt accelerators for use with the subject invention are members of the class of diarylhalonium salts described by Crivello in U.S. Pat. No. 3,981,897. Although the diphenyliodonium salts are preferred herein any member of the diarylhalonium salt catalysts therein described could be utilized.

The radiation sensitive aromatic halonium salts for use with the subject invention are compounds of the formula, $$[(R)_a(R')_bX]_c{}^+[MQ_d]^{-(d-e)}$$

wherein R is a monovalent aromatic organic radical, $R^1$ is a divalent aromatic organic radical, X is a halogen radical such as I, Br, Cl, etc., M is a metal or metalloid and Q is a halogen radical such as Cl, F, Br, I, etc. a is a whole number equal to 0 or 2, b is a whole number equal to 0 or 1, the sum of a+b is equal to 2 or the valence of X, c=d−e e=valence of M and is an integer equal to 2 to 7 inclusive, and d is >e and is an integer having a value up to 8.

Radicals included by R can be the same or different, aromatic carbocyclic or heterocyclic radical having from 6 to 20 carbon atoms, which can be substituted with from 1 to 4 monovalent radicals selected from C(1-8)alkoxy, C(1-8)alkyl, nitro, chloro, etc., R is more particularly, phenyl, chlorophenyl, nitrophenyl, methoxyphenyl, pyridyl, etc. Radicals included by $R^1$ are divalent radicals such as

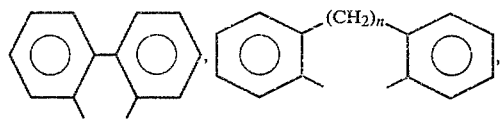

etc. Metal or metalloids included by M of the formula are transition metals such as Sb, Fe, Sn, Bi, Al, Ga, In, Ti, Zr, Sc, V, Cr, Mn, Cs, rare earth elements such as lanthanides, for example, Cd, Pr, Nd, etc., actinides, such as Th, Pa, U, Np, etc. and metalloids such as B, P, As, etc. Complex anions included by $MQ_d{}^{-(d-e)}$ are, for example, $BF_4{}^-$, $PF_6{}^-$, $AsF_6{}^-$, $SbF_6{}^-$, $FeCl_4{}^-$, $SnCl_6{}^-$, $SbCl_6{}^-$, $BiCl_5{}^-$, etc.

Some halonium salts included by the formula are, for example,

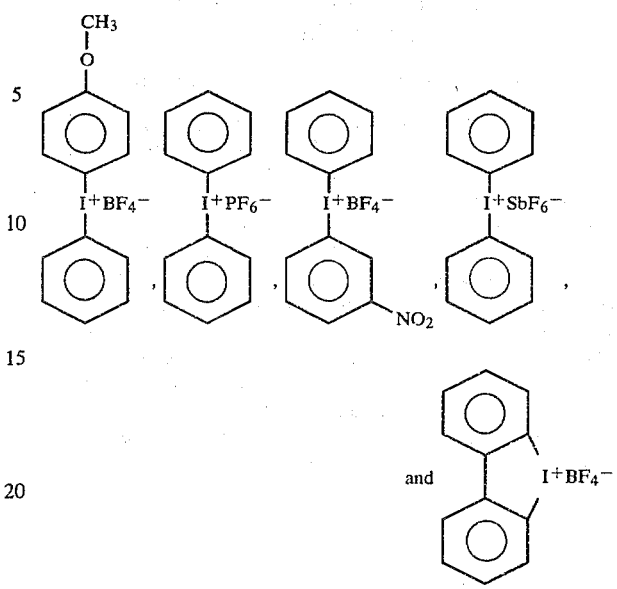

The halonium salts are presently well known and can be made by the procedures described by O. A. Ptitsyna, M. E. Pudecva, et al., Dokl, Adad Nauk, SSSR, 163, 383 (1965); Dokl, Chem., 163, 671 (1965). F. Marshall Beringer, M. Drexler, E. M. Gindler, J. Am. Chem. Soc., 75, 2705 (1953). J. Collette, D. McGreer, R. Crawford, et al., J. Am. Chem. Soc. 78, 3819 (1956).

The curing agents used in the process of the present invention are carboxylic acids or acid anhydrides. The carboxylic acids used may be saturated, unsaturated, aliphatic, cycloaliphatic, aromatic or heterocyclic. Examples of these acids include, among others succinic acid, glutaric acid, adipic acid, pimelic acid, suberic acid, azelaic acid, sebacic acid, oxalic acid, abietic acid, maleic acid, aconitic acid, chlorendic acid and phthalic acid.

The acid anhydrides used may be any anhydride which is derived from a carboxylic acid and possesses at least one anhydride group, i.e., a

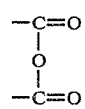

group. The carboxylic acids used in the formation of the anhydrides may be saturated, unsaturated, aliphatic, cycloaliphatic, aromatic or heterocyclic. Examples of these anhydrides include, among others, phthalic anhydride, isophthalic anhydride, di-, tetra- and hexahydrophthalic anhydride, 3,4,5,6,7,7-hexachloro-3-6-endomethylene 1,2-tetrahydrophthalic anhydride (chlorendic anhydride), succinic anhydride, maleic anhydride, chlorosuccinic anhydride, monochloromaleic anhydride, 6-ethyl-4-cyclohexene-1,2-dicarboxylic acid anhydride, 3,6-dimethyl-4-cyclohexene-1,2-dicarboxylic acid anhydride, 6-butyl-3,5-cyclohexadiene-1,2-dicarboxylic acid anhydride, octadecylsuccinic acid anhydride, dodecylsuccinic acid anhydride, dioctyl succinic anhydride, nonadecadienylsuccinic anhydride, adducts of maleic anhydride with polyunsaturates, such as methylcyclopentadiene. (Nadic methyl anhydride), 3-methoxy-1,2,3,6-tetrahydrophthalic acid anhydride, 3-butoxy-1,2,3,6-tetrahydrophthalic anhydride, trimellitic anhydride, pyromellitic anhydride, di-, tetra- and hexahydropyromellitic anhydride, polyadipic acid anhydride, polysebacic acid anhydride, and the like and mixtures thereof. Derivatives of the anhydrides, such as their partial esters, amides, etc., may also be employed. Examples of these include, for example, esters of glycols and pyromellitic anhydride and partial esters of trimellitic anhydride.

Preferred anhydrides to be employed in the process comprise the normally liquid or low melting anhydrides, such as hexahydrophthalic anhydride.

The polyepoxides which may be cured in accordance with the subject invention are numerous. Particularly, any polyepoxide possessing more than one epoxy group i.e., more than one

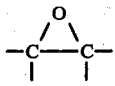

group; which group may be a terminal group, i.e.,

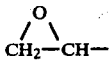

or may be in an internal position.

The polyepoxides may be saturated or unsaturated, aliphatic, cycloaliphatic, aromatic or heterocyclic and may be substituted with substituents, such as chlorine, hydroxyl group, ether radicals and the like.

Examples of such polyepoxides include, among others, 1,4-bis(2,3-epoxypropoxy)benzene, 1,3-bis(2,3-epoxypropoxy)benzene, 4,4'-bis(2,3-epoxypropoxy)diphenyl ether, 1,8-bis(2,3-epoxypropoxy)octane 1,4-bis(2,3-epoxypropoxy)cyclohexane, 4,4'-bis(2-hydroxy-3,4'-epoxybutoxy)diphenyl dimethylmethane, 1,3-bis(4,5-epoxy-pentoxy)-5-chlorobenzene, 1,4-bis(3,4-epoxy-epoxybutoxy)benzene, 1,4-bis(2-hydroxy-4,5-epoxy-pentoxy)benzene.

Other examples include the epoxy polyethers of polyhydric phenol with a halogen-containing epoxide or dihalohydrin in the presence of an alkaline medium. Polyhydric phenols that can be used for this purpose include, among others, resorcinol, catechol, hydroquinone, methyl resorcinol, or polynuclear phenols, such as 2,2-bis(4-hydroxyphenyl)propane (bisphenol A), 2,2-bis(4-hydroxyphenol)butane, 4,4'-dihydroxybenzophenone, bis-(4-hydroxyphenyl)ethane, 2,2-bis(4-hydroxyphenyl)-pentane and 1,5-dihydroxynaphthalene. The halogen-containing epoxides may be further exemplified by 3-chloro-2,3-chloro-1,2-epoxybutane, 3-bromo-1,2-epoxyhexane, 3-chloro-1,2-epoxyoctane, and the like. By varying the ratios of the phenol and epichlorohydrin one obtains different molecular weight products as shown in U.S. Pat. No. 2,633,458.

A preferred group of the above-described epoxy polyethers of polyhydric phenols are glycidyl polyethers of the dihydric phenols. These may be prepared by reacting the required proportions of the dihydric phenol and epichlorohydrin in an alkaline medium. The desired alkalinity is obtained by adding based substances such as sodium or potassium hydroxide, preferably in stoichiometric excess to the epichlorohydrin. The reaction is preferably accomplished at temperatures within the range of 50° C. to 150° C. The heating is continued for several hours to effect the reaction and the product is then washed free of salt and base.

Another group of polyepoxides comprises the polyepoxy polyethers obtained by reacting, preferably in the presence of an acid-acting compound, such as hydrofluoric acid, or of the aforedescribed halogen-containing epoxides such as epichlorohydrin, with a polyhydric alcohol and subsequently treating the resulting product with an alkaline component. As used herein the expression "Polyhydric alcohol" is meant to include those compounds having at least two free alcoholic OH groups and includes the polyhydric alcohols and their ethers and esters, hydroxy-aldehydes, hydroxy-ketones, halogenated polyhydric alcohols and the like. Polyhydric alcohols that may be used for this purpose may be exemplified by glycerol, propylene, glycol, ethylene glycol, diethylene glycol, butylene glycol, hexanetriol, sorbitol, mannitol, pentaerythritol, polyallyl alcohol, polyvinyl alcohol, inositol, trimethylolpropane, bis(4-hydroxycyclohexyl)dimethylmethane and the like.

Particularly preferred members of this group comprising the glycidyl polyethers of aliphatic polyhydric alcohols containing from 2 to 10 carbon atoms and having from 2 to 6 hydroxyl groups and more preferably the alkane polyols containing from 2 to 8 carbon atoms and having from 2 to 6 hydroxyl groups. Such products preferably have an epoxy equivalency greater than 1.0, and still more preferably between 1.1 and 4 and a molecular weight between 30 and 1000.

Another group of polyepoxides include the epoxy esters of polybasic acids, such as diglycidyl phthalate and diglycidyl adipate, diglycidyl tetrahydrophthalate, diglycidyl maleate, epoxidized dimethylallyl phthalate and diglycidyl adipate, diglycidyl tetrahydrophthalate, diglycidyl maleate, epoxidized dimethylallyl phthalate and epoxidized dicrotyl phthalate.

Examples of polyepoxides having internal epoxy groups include, among others, the epoxidized esters of polyethylenically unsaturated monocarboxylic acids, such as epoxidized linseed, soybean, perilla, oiticica, tung, walnut, and dehydrated castor oil, methyl linoleate, butyl linoleate, ethyl 9,12-octadecadienoate, butyl 9,12,15-octadecatrienoate, ethyl eleostearate, octyl 9,12-octadecadienoate, methyl eleostearate, monoglycerides of tung oil fatty acids, monoglycerides of soybean oil, sunflower, rapeseed, hempseed, sardine, cottonseed oil, and the like.

Another group of the epoxy-containing materials having internal epoxy groups include the epoxidized esters of unsaturated alcohols having the ethylenic group in an internal position and polycarboxylic acids, such as, for example, di(2,3-epoxybutyl)adipate, di(2,3-epoxybutyl)oxalate, di(2,3-epoxyhexyl)succinate, di(2,3-epoxyoctyl)tetrahydrophthalate, di(4,5-epoxydodecyl)maleate, di(2,3-epoxybutyl)terephthalate, di(2,3-epoxypentyl)thiopropionate, hexyl)succinate, di(2,3-epoxyoctyl)tetrahydrophthalate, di(4,5-epoxydodecyl)-maleate, di(2,3-epoxybutyl)terephthalate, di(2,3-epoxypentyl)thiopropionate, di(2,3-epoxybutylcitrate) and di(4,5-epoxyoctadecyl)malonate, as well as the esters of epoxycyclohexanol and epoxycyclohexylalkanols, such as, for example, di(2,3-epoxycyclohexylmethyl)adipate and di(2,3-epoxycyclohexylmethyl)phthalate.

Another group of materials having internal epoxy groups include epoxidized esters of unsaturated alcohols and unsaturated carboxylic acids, such as 2,3-epoxybutyl 3,4-epoxypentanoate, 3,4-epoxyhexyl 3,4-epoxypentanoate, 3,4-epoxycyclohexyl 3,4-cyclohexanoate, 2,3-epoxycyclohexylmethyl 2,3-epoxycyclohexanoate, and 3,4-epoxycyclohexyl 4,5-epoxyoctanoate, and the like.

Another group of material having internal epoxy groups includes epoxidized esters of unsaturated monocarboxylic acids and polyhydric alcohols, such as ethylene glycol di(2,3-epoxycyclohexanoate), glycerol tri(2,3-epoxycyclohexanoate) and pentanediol di(2,3-epoxyoctanoate).

Still another group of the epoxy compounds having internal epoxy groups include epoxidized derivatives of polyethylenically unsaturated polycarboxylic acids, such as, for example, dimethyl 8,9,11,13-diepoxyeiosanedioate, dibutyl 7,8,11,12-diepoxyoctadecanedioate, dioctyl 10,11-diethyl-8,9,12,13-diepoxyeicosanedioate, dicyclohexyl 3,4,5,6-diepoxycyclohexanedicarboxylate, dibenzyl 1,2,4,5-diepoxycyclohexane-1,2-dicarboxylate and diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosanedienedioic acid with ethylene glycol, the polyester obtained by reacting diethylene glycol with 2-cyclohexane-1,4-dcarboxylic acid and the like, and mixtures thereof.

Another group comprises the epoxidized polymers and copolymers of diolefins, such as butadiene. Examples of this include, among others, butadiene-acrylonitrile copolymers (hycar rubbers), butadiene-styrene copolymers and the like.

In accordance with the subjection, invention, the polyepoxide is cured in the presence of the acid or acid anhydride and a diphenyliodonium salt accelerator. The amount of acid or anhydride used in the process may vary over a wide range. Typically, to obtain a good cure the polyepoxide will be reacted with at least 0.5 equivalent of the anhydride or acid. As used herein, the expression "equivalent" amount refers to that amount of acid or acid anhydride needed to furnish one carboxylic or anhydride group for every epoxy group in the polyepoxide to be involved in the cure. Generally excellent results may be obtained if the acid or anhydride and polyepoxide are present in about equivalent amounts, that is in about a 1:1 ratio.

Only a small amount of the diarylhalonium salt accelerator need be used to effectively reduce the time and temperature of the curing reaction. Improved results may be provided when the accelerator is used in amounts ranging from 0.01% to 10% by weight of the overall composition, and more preferably in amounts ranging from 0.05 to 5% of the composition.

In executing the process of the invention, it is desirable to have the polyepoxide in a mobile liquid condition when the curing agent or catalyst is added in order to facilitate mixing. With those polyepoxides that are liquid, but too viscous for ready mixing, one may either heat to reduce viscosity, or have a liquid solvent added thereto in order to provide fluidity. Normally solid polyepoxides are likewise melted or mixed with a liquid solvent. Various solvents are suitable for achieving the desired fluidity. They may be volatile solvents which escape from the polyepoxide composition containing the curing agent and catalyst by evaporation before or during the curing, such as esters like ethyl acetate, butyl acetate, Cellosolve acetate (acetate of ethylene glycol monoethyl ether), methyl Cellosolve acetate (acetate of ethylene glycol monomethyl ether), etc., chlorinated hydrocarbons such as trichloropropane, chloroform, etc. and ether alcohols such as methyl, ethyl or butyl ether of ethylene glycol or diethylene glycol. These solvents may be used in admixture with aromatic hydrocarbons such as benzene, toluene, xylene, etc. and/or alcohols such as ethyl, isopropyl, or n-butyl alcohol. Solvents which remain in the cured composition may also be used, such as diethyl phthalate, dibutyl phthalate, or liquid monoepoxide compounds, including glycidyl allyl ether, glycidyl phenyl ether, styrene oxide, 1-2-hexylene oxide and the like, as well as cyano-substituted hydrocarbons, such as acetonitrile, propionitrile, adiponitrile, benzonitrile, and the like. It is also convenient to employ the solid or semi-solid polyepoxides in combinations with a liquid polyepoxide, such as normally liquid glycidyl polyether of polyhydric alcohol. Various other ingredients may be mixed with the polyepoxide composition including pigments, fillers, sand, rock, resin particles, graphite, asbestos, glass or metal oxide fibers, stabilizers, asphalts, tars, fungicides, insecticides, anti-oxidant, dyes, plasticizers, and the like.

The curing of the above-described polyepoxide-acid or anhydride-accelerator admixture may be accomplished by heating by exposure to actinic radiation, or by a combination of both. The curing reaction, as catalyzed by the accelerators of the subject invention is a triggered reaction, i.e.—once the degradation of the diarylhalonium complex salt has been initiated by heating or by exposure to a radiation source, the curing reaction proceeds and will continue after the radiation source is removed. The use of thermal energy during or after exposure to radiation source will generally accelerate the curing or hardening reaction, and even a moderate increase in temperature may greatly accelerate hardening rate.

Thermal curing is accomplished by heating the ingredients of the admixture to above room temperature, and preferably to a temperature between 100° C. and 200° C.

Photocuring of the compositions occurs upon exposure to any source of radiation emitting actinic radiation at a wavelength within the ultraviolet spectral region. Suitable sources of radiation include mercury, xenon, carbon arc and tungsten filament lamps, sunlight etc. Exposures may be from less than about five seconds to five minutes or more depending on the amounts of particular polyepoxides, acids or acid anhydrides, and diarylhalonium complex salts being utilized; and depending on the radiation source, and distance from the source, and the thickness of the coating or molded article to be cured. The compositions may also be cured by exposure to electron beam irradiation.

In accordance with the subject invention, the diphenyliodonium salts are effective accelerators of the curing reaction between carboxylic acids or acid anhydrides and polyepoxides. The compositions and methods provided by the subject invention allow the polyepoxides to assume a thermoset state in quicker reaction times and at lower temperatures. The following examples are provided to better illustrate the present invention.

EXAMPLE I

A curable epoxy resin composition was prepared in the following manner. An admixture of 55% by weight diglycidyl ether of bisphenol A and 45% by weight of methyl tetrahydrophthalic anhydride was prepared. This admixture was divided into four equal parts.

Diphenyliodonium hexafluoroarsenate was added to three of the four parts in the following amounts: 0.25% by weight, of the first part; 0.50% by weight of the second part; and 1.0% by weight of the third part. No diphenyliodonium hexafluoroarsenate was added to the fourth part. After the addition of the diarylhalonium salt, each of the four parts were blended until all the ingredients were thoroughly mixed.

Equivalent aliquots of each part were isolated and heated to various temperatures and the gel times for each were recorded. The following table summarizes the results.

TABLE I

| Temperature °C. | GEL TIME (Minutes) | | | |
|---|---|---|---|---|
| | Part I .25% $\phi_2IAsF_6$ | Part II 0.50% $\phi_2IAsF_6$ | Part III 1.0% $\phi IAsF_6$ | Part IV NO $\phi_2IASF_6$ |
| 200° | 19.3 | 7.1 | 5.2 | 143.2 |
| 180° | 19.6 | 11.8 | 5.7 | — |
| 160° | 36.9 | 24.1 | 15.5 | — |
| 140° | — | 55.5 | 33.7 | — |

The addition of diphenyliodonium hexafluoroarsenate is an effective accelerator of the curing reaction between polyepoxides and acids or acid anhydrides.

EXAMPLE II

A 5 ml. sample of the admixture containing 1% diphenyliodonium hexafluoroarsenate (Part III) described in Example I was exposed to a UV floodlight for 60 seconds. The sample cured to a tack free state within one minute.

Although the present invention has been described with reference to a preferred embodiment, it is apparent that modifications and changes may be made therein by those skilled in the art. For example, other known aromatic complex salt photoinitiators such as aromatic onium salts of the group Va or group VIa elements may be substituted for the aromatic halonium salt accelerators described herein. Such modifications are within the full intended scope of the invention as defined by the appended claims.

What is claimed:

1. A process for curing polyepoxides which comprises:
   (a) preparing an admixture comprising:
      (i) a polyepoxide having more than one epoxy group; and
      (ii) at least 0.5 equivalents of at least one member selected from the group consisting of polycarboxylic acid, polycarboxylic acid anhydride or mixtures thereof;
   (b) adding to said admixture from about 0.01% to about 10% by weight of said admixture of a diarylhalonium complex salt accelerator having the formula $[(R)_a(R')_b X]_c^+ [MQ_d]^{-(d-e)}$ where R is a monovalent organic radical, R' is a divalent aromatic organic radical X is a halogen radical such as I,Br,Cl, etc., M is a metal or metalloid and Q is a halogen radical such as Cl,F,Br,I, etc., a is a whole number equal to 0 or 2, b is a whole number equal to 0 or 1, the sum of a+b is equal to 2 or the valence of X, c+d−e, e+the valence of M and is an integer equal to 2 to 7 inclusive, and d is >e and is an integer having a value up to 8;
   (c) exposing said admixture to a means for initiating a curing reaction; and
   (d) allowing said curing reaction to continue until substantially complete.

2. A process as recited in claim 1 wherein said means for initiating the curing reaction comprises heat sufficient to raise the temperature of the admixture to above room temperature.

3. A process as recited in claim 1 wherein said means for initiating the curing reaction comprises a source of ultraviolet radiation.

4. A process as recited in claim 1 wherein the diarylhalonium complex salt accelerator is a diphenyliodonium salt accelerator.

5. A process as recited in claim 1 wherein said polycarboxylic acid anhydride comprises tetrahydrophthalic anhydride.

6. A process as recited in claim 1 wherein said polyepoxide comprises diglycidyl ether of bisphenol A.

7. The process of claim 1 wherein said polyepoxide and at least one of said group are present in about equivalent amounts.

8. The process of claim 1 wherein diarylhalonium complex salt is added in a concentration of from about 0.05% to about 5% by weight of said admixture.

9. A composition comprising the mixture of:
   (a) a polyepoxide having more than one epoxy group;
   (b) at least 0.5 equivalents of at least one member selected from the group consisting of:
      (i) a polycarboxylic acid,
      (ii) a polycarboxylic acid anhydride, and
      (iii) mixtures thereof;
   (c) from about 0.01% to about 10% by weight of said composition of a diarylhalonium complex salt accelerator having the formula $[(R)_a(r')_b X]_c^+ [MQ_d]^{-(e-e)}$ where R is a monovalent organic radical, R' is a divalent aromatic organic radical X is a halogen radical such as I,Br,Cl, etc., M is a metal or metalloid and Q is a whole number equal to 0 or 1, the sum of a+b is equal to 2 or the valance of X, c+d−e, e+the valence of M and is an integer equal to 2 to 7 inclusive, and d is >e and is an integer having a value up to 8.

10. The composition of claim 9 wherein the polyepoxide and the at least one of said group are present in about equivalent amounts.

11. The composition of claim 9 wherein said complex salt is present in a concentration of from about 0.05% to about 5.0% by weight of said composition.

* * * * *